US012809232B2

(12) United States Patent
Takatori

(10) Patent No.: US 12,809,232 B2
(45) Date of Patent: Nov. 24, 2026

(54) ACCESSORY DETACHABLY ATTACHABLE TO IMAGE PICKUP APPARATUS AND CONTROL METHOD FOR ACCESSORY

(71) Applicant: CANON KABUSHIKI KAISHA, Tokyo (JP)

(72) Inventor: Tatsuo Takatori, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 198 days.

(21) Appl. No.: 18/487,856

(22) Filed: Oct. 16, 2023

(65) Prior Publication Data

US 2024/0126143 A1 Apr. 18, 2024

(30) Foreign Application Priority Data

Oct. 18, 2022 (JP) ................................ 2022-166754

(51) Int. Cl.

| | |
|---|---|
| ***G03B 15/05*** | (2021.01) |
| ***H04N 23/56*** | (2023.01) |
| ***H04N 23/60*** | (2023.01) |
| ***H04N 23/62*** | (2023.01) |
| ***H04N 23/667*** | (2023.01) |

(52) U.S. Cl.

CPC ............. *G03B 15/05* (2013.01); *H04N 23/56* (2023.01); *H04N 23/62* (2023.01); *H04N 23/64* (2023.01); *H04N 23/667* (2023.01)

(58) Field of Classification Search

CPC ...... H04N 23/56; H04N 23/667; H04N 23/64; H04N 23/62; H04N 23/663; G03B 15/05

See application file for complete search history.

(56) References Cited

U.S. PATENT DOCUMENTS

2016/0072995 A1* 3/2016 Kojima .................... G03B 7/17 348/371
2017/0257541 A1* 9/2017 Saito ...................... G03B 15/05
2017/0289423 A1* 10/2017 Yamamoto ......... G03B 15/0473
2019/0394382 A1* 12/2019 Shu ........................ H04N 23/56
2021/0185220 A1* 6/2021 Izaki .................... H04N 23/631
2022/0159172 A1* 5/2022 Bellessort ............ H04N 23/661

FOREIGN PATENT DOCUMENTS

JP 2009037122 A 2/2009
JP 2013033219 A 2/2013
JP 2018084681 A 5/2018
JP 2020003581 A 1/2020

* cited by examiner

*Primary Examiner* — Kelly L Jerabek
(74) *Attorney, Agent, or Firm* — Canon U.S.A., Inc. IP Division

(57) ABSTRACT

An accessory attachable to and detachable from an image pickup apparatus includes at least one processor to function as an acquisition unit configured to acquire information about an image capturing mode of the image pickup apparatus to which the accessory is attached, a setting unit configured to set a setting value of a predetermined item, and a detection unit configured to detect an activation state of the image pickup apparatus, wherein the setting unit sets a predetermined setting value as the setting value of the predetermined item in a case where the acquired information indicates a first image capturing mode, and the setting unit sets the setting value of the predetermined item to be changeable from the predetermined setting value in a case where the activation state is detected as a non-activated state while the predetermined setting value is set as the setting value of the predetermined item.

13 Claims, 7 Drawing Sheets

FIG.5

| FUNCTION NAME | DEFAULT SETTING VALUE |
|---|---|
| LIGHT EMISSION MODE | AUTOMATIC LIGHT CONTROL (ETTL) |
| LIGHT CONTROL CORRECTION AMOUNT | ±0 |
| WIRELESS SETTING | NON-WIRELESS SETTING |
| ZOOM POSITION SETTING | AUTO (CONFORMING TO LENS INFORMATION) |
| FLASH SYNCHRONIZATION SETTING | LEADING CURTAIN SYNCHRONIZATION SETTING |

ACCESSORY DETACHABLY ATTACHABLE TO IMAGE PICKUP APPARATUS AND CONTROL METHOD FOR ACCESSORY

BACKGROUND

Field

The present disclosure relates to an accessory detachably attachable to an image pickup apparatus.

Description of the Related Art

Conventionally, there has been a function of restricting the functions of an accessory attached to a camera and making predetermined settings (default settings), depending on an image capturing mode acquired using a unit for communicating with the camera. For example, in the case of an image capturing mode in which image capturing parameters (a shutter speed, an aperture value, and an International Organization for Standardization (ISO) sensitivity) of the camera are automatically determined, a conceivable user can be an entry-level user. In this case, even if the user does not have much knowledge about the accessory, the user can easily use the accessory based on the default settings. In a case where the accessory is a light emission device, the light emission device itself automatically sets various items to predetermined settings (default settings), such as automatic light control for a light emission mode and AUTO for zoom setting, so that the user can use the light emission device without worrying about detailed settings of the light emission device.

Japanese Patent Application Laid-Open No. 2013-33219 discusses a technique of controlling an accessory by selecting processing to be executed in the accessory based on an image capturing mode of a camera.

However, to cancel the default settings of the accessory in such a function, it is desirable to change the image capturing mode of the camera, which reduces operability. In Japanese Patent Application Laid-Open No. 2013-33219, a change in the state of connection between the camera and the accessory is not considered.

SUMMARY

According to embodiments of the present disclosure, an accessory configured to be attachable to and detachable from an image pickup apparatus includes at least one processor configured to function as an acquisition unit configured to acquire information about an image capturing mode of the image pickup apparatus to which the accessory is attached, a setting unit configured to set a setting value of a predetermined item, and a detection unit configured to detect an activation state of the image pickup apparatus to which the accessary is attached, wherein the setting unit sets a predetermined setting value as the setting value of the predetermined item in a case where the information acquired by the acquisition unit indicates a first image capturing mode, and the setting unit sets the setting value of the predetermined item to be changeable from the predetermined setting value in a case where the activation state of the image pickup apparatus to which the accessary is attached is detected by the detection unit as a non-activated state in a state where the predetermined setting value is set as the setting value of the predetermined item.

Further features of the present disclosure will become apparent from the following description of exemplary embodiments with reference to the attached drawings.

BRIEF DESCRIPTION OF THE DRAWINGS

FIG. 5 is a diagram illustrating default setting values of the accessory according to the exemplary embodiment of the present disclosure.

DESCRIPTION OF THE EMBODIMENTS

Exemplary embodiments of the present disclosure will be described in detail with reference to the attached drawings.

Figure 1:
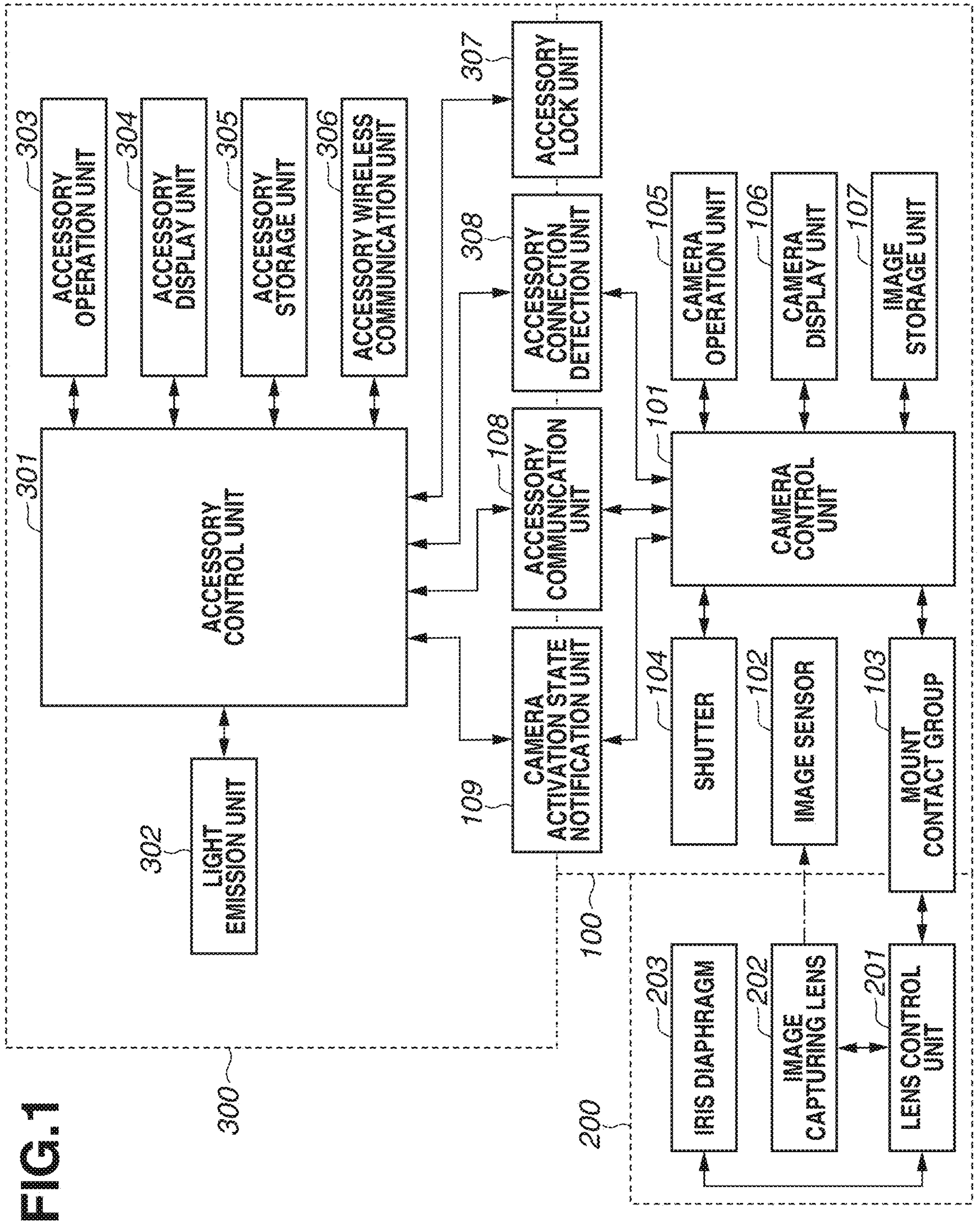
FIG. 1 is a diagram illustrating a configuration of a camera system according to an exemplary embodiment of the present disclosure.

FIG. 1 is a diagram illustrating a configuration of a camera system including an image pickup apparatus and an accessory detachably attached to the image pickup apparatus according to an exemplary embodiment of the present disclosure. In the camera system in FIG. 1, the image pickup apparatus includes a camera body 100 and a lens 200. The camera body 100 and the lens 200 are mechanically and electrically connected via a mount contact group 103. In the present exemplary embodiment, the lens 200 is configured to be detachably attached to the camera body 100, but may be configured to be integral with the camera body 100. An accessory shoe portion (not illustrated) to which an accessory 300 is detachably attachable is disposed on the top surface of the camera body 100. The accessory shoe portion may have a known structure and is not particularly limited to any type. In the present exemplary embodiment, the accessory 300 is a flash device that is a light emission device, but may be any type of accessory, including a microphone, a video light, and a wireless communication device, if the accessory is detachably attachable to the camera body 100 and operates in conjunction with the image pickup apparatus.

The camera body 100 and the accessory 300 are electrically connected via an accessory communication unit 108, a camera activation state notification unit 109, and an accessory connection detection unit 308. The camera body 100 and the accessory 300 can be fixed by moving an accessory lock unit 307 to a locking position.

A configuration of the camera body 100 will be described. A camera control unit 101 is a microcomputer that controls the operation of each unit of the camera body 100. An image sensor 102 includes a sensor including a photoelectric conversion element such as a complementary metal-oxide semiconductor (CMOS), an infrared cut filter, and a low-pass filter. A shutter 104 is disposed between the image sensor 102 and the lens 200. The shutter 104 closes to shield the image sensor 102 from light when an image is not captured, and opens to guide incident light passing through the lens 200 to the image sensor 102 when a live view is displayed or an image is captured, in response to an instruction from the camera control unit 101. A configuration including a so-called electronic shutter in place of the physical shutter may be adopted.

A camera operation unit 105 includes operation members to be operated by a user. The camera operation unit 105 detects an operation performed by the user via a button, a switch, a dial, a connected device, or the like disposed in the camera body 100, and transmits a signal in response to an instruction corresponding to the detected operation to the camera control unit 101. The camera operation unit 105 outputs an instruction signal (hereinafter referred to as "SW1 signal") in a case where a half-press operation to press a release button halfway is performed by the user, and an instruction signal (hereinafter referred to as "SW2 signal") in a case where a full-press operation to press the release button deeper is performed by the user, to the camera control unit 101. A camera display unit 106 displays image capturing information and a captured image, in response to an instruction from the camera control unit 101.

The camera control unit 101 controls the operation of the camera body 100, based on an output signal from the camera operation unit 105. In a case where the output signal from the camera operation unit 105 is the SW1 signal, the camera control unit 101 performs image pickup by driving the image sensor 102, repeats photometry control for measuring luminance of a subject based on the image pickup result, and determines a shutter speed, an aperture value, and an International Organization for Standardization (ISO) sensitivity to be used in capturing an image, based on the photometry result. The shutter speed, the aperture value, and the ISO sensitivity to be used in image capturing will be collectively referred to as "exposure control values". The determined exposure control values are displayed on a screen of the camera display unit 106. In a case where the output signal from the camera operation unit 105 is the SW2 signal, the camera control unit 101 performs image pickup by driving an iris diaphragm 203 in the lens 200, setting a sensitivity (ISO sensitivity) of the image sensor 102, and controlling the shutter 104.

The camera control unit 101 performs control to display a captured image on the screen of the camera display unit 106 based on image data acquired from the image sensor 102, and to write the image data in an image storage unit 107.

The camera control unit 101 notifies the accessory 300 of a camera state via the camera activation state notification unit 109, based on a power status of the camera body 100. For example, in a case where the output signal from the camera operation unit 105 is a power switch off signal, the camera control unit 101 blocks power supply, so that the signal level of the camera activation state notification unit 109 changes to the low level. The accessory 300 detects the change of the camera power state to the off state caused by the change of the signal level of the camera activation state notification unit 109 to the low level. The change of the signal level to the low level corresponds to the notification of the camera state.

A configuration of the lens 200 will be described. A lens control unit 201 is a microcomputer that controls the operation of each unit of the lens 200. An image capturing lens 202 includes a plurality of lenses, and forms a subject image on the image sensor 102. A focus lens for adjusting focus and a zoom lens for adjusting an angle of view (neither lens illustrated) are disposed in the image capturing lens 202. The iris diaphragm 203 adjusts the amount of light to be taken into the camera body 100 by changing the size of an aperture.

The lens control unit 201 adjusts the amount of light to be taken into the camera body 100 and the focus, by performing control via the mount contact group 103, in response to an instruction from the camera control unit 101.

A configuration of the accessory 300 will be described. The accessory 300 will be described using the flash device that is the light emission device as an example. An accessory control unit 301 is a microcomputer that controls the operation of each unit of the accessory 300.

The accessory control unit 301 can communicate with the camera control unit 101 via the accessory communication unit 108, and can receive a light-emission control instruction and camera information from the camera control unit 101 and transmit accessory information to the camera control unit 101. The communication method may provide a plurality of communications (e.g., one is a high-rate communication and the other is a low-rate communication). For example, a configuration that may be adopted has a communication method for communication to manage power restriction of the camera body 100 and state change signals of the accessory 300, and a communication method mainly for controlling image capturing by the camera body 100.

A light emission unit 302 includes a discharge tube, a condenser for light emission, a light emission circuit, and a light emission optical system, and can emit flashlight.

An accessory operation unit 303 includes members to be operated by a user, and detects an operation performed by the user via a button, a dial, a switch, or the like disposed in the accessory 300, and transmits a signal in response to an instruction corresponding to the detected operation to the accessory control unit 301.

An accessory display unit 304 displays a light emission setting, a radio wave setting, an operating state of the accessory 300, and the like, in response to an instruction from the accessory control unit 301.

An accessory storage unit 305 is a non-volatile memory electrically connected to the accessory control unit 301, and the accessory control unit 301 performs setting in the accessory storage unit 305 via serial communication. Information to be stored in the accessory storage unit 305 in the present exemplary embodiment is information such as control information, setting information, and adjustment values of the accessory 300.

An accessory wireless communication unit 306 transmits and receives wireless communication information to and from a wirelessly connected other electronic device via a radio antenna. The accessory control unit 301 can transmit and receive control information to and from the wirelessly connected other electronic device via the accessory wireless communication unit 306.

Figure 2A:
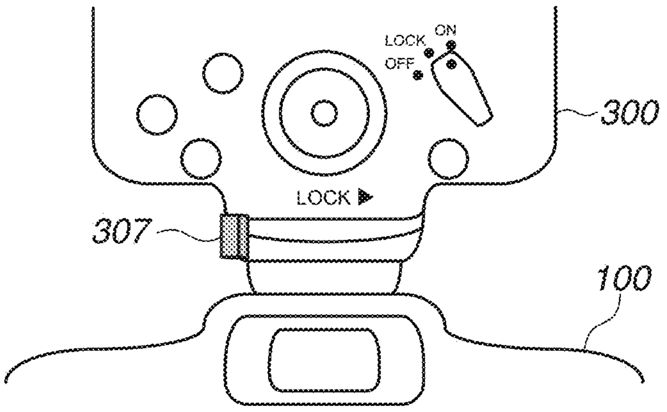
FIGS. 2A to 2C are diagrams illustrating locking operation by an accessory lock unit of an accessory according to the exemplary embodiment of the present disclosure.
Figure 2B:
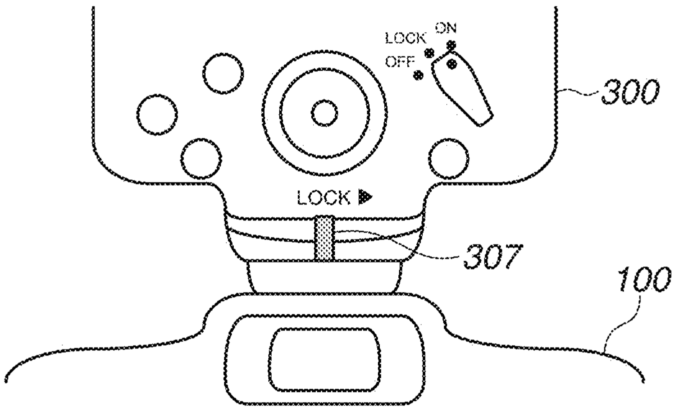
Figure 2C:
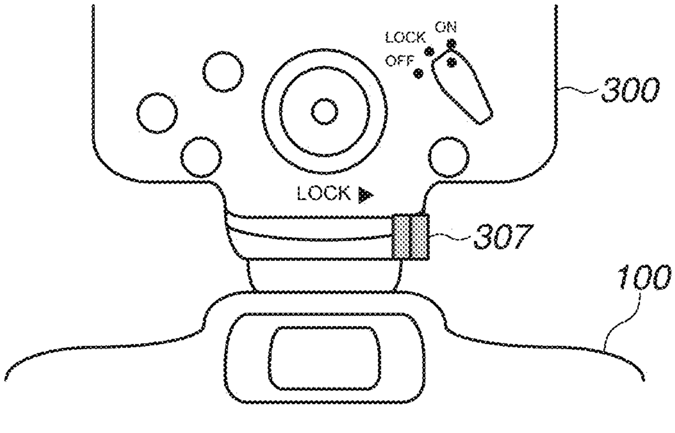

The accessory lock unit 307 is a member for fixing the accessory 300 to the accessory shoe portion (not illustrated) of the camera body 100, and a lever of the accessory lock unit 307 is movable between an unfixing (unlocking) position and a fixing (locking) position. FIGS. 2A to 2C are diagrams illustrating locking operation by the accessory lock unit 307. The accessory 300 and the camera body 100 can be fixed (locked) by moving the lever of the accessory lock unit 307 from the unfixing position in FIGS. 2A and 2B to the fixing position at the right end in FIG. 2C. The method for fixing the accessory 300 and the camera body 100 is not limited to a specific method, and a known method may be used. For example, there is a method of moving a movement member that moves with movement of the lever of the accessory lock unit 307, to a position for engaging with the accessory shoe portion of the camera body 100, by moving the lever to the locking position, so that the accessory 300 and the camera body 100 are fixed.

The accessory connection detection unit 308 outputs an accessory detection signal to the camera control unit 101 when the accessory lock unit 307 moves to the unfixing position or the fixing position, so that the camera control unit 101 can detect a connection state. The accessory lock unit 307 and the accessory connection detection unit 308 may be electrically connected and a signal may be thereby output in conjunction with the accessory lock unit 307. The accessory control unit 301 may control the output signal of the accessory connection detection unit 308 by detecting a switch state of the accessory lock unit 307.

Figure 3:
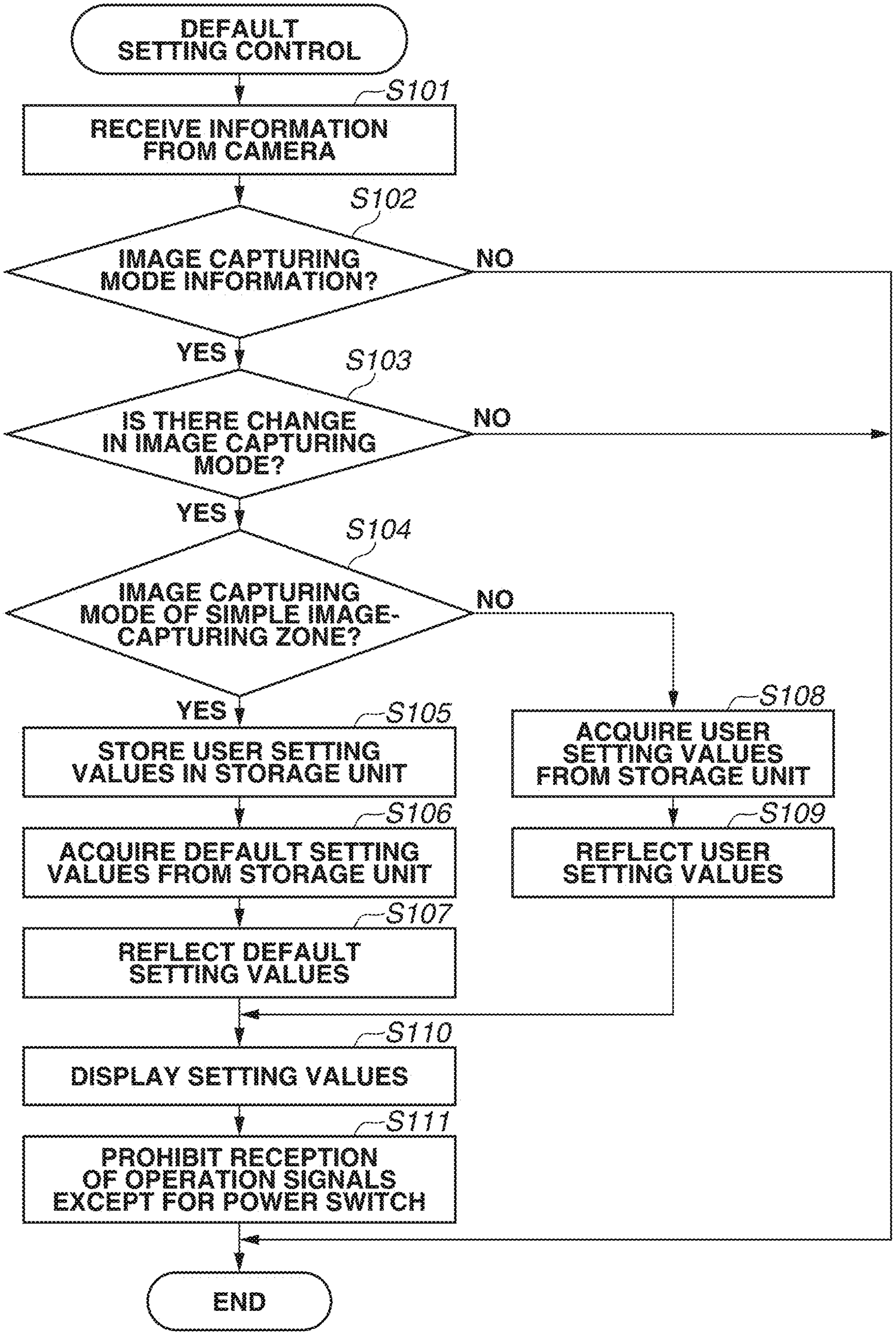
FIG. 3 is a diagram illustrating a flowchart of default setting control of the accessory according to the exemplary embodiment of the present disclosure.
Figure 4A:
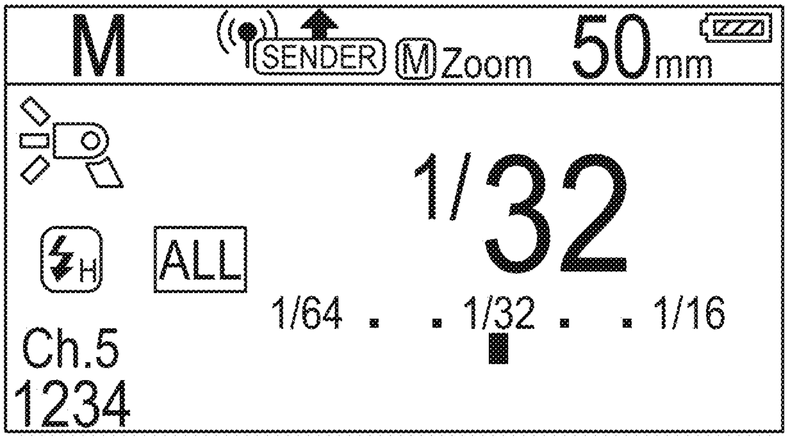
FIGS. 4A to 4C are diagrams illustrating a display screen of the accessory according to the exemplary embodiment of the present disclosure.
Figure 4B:
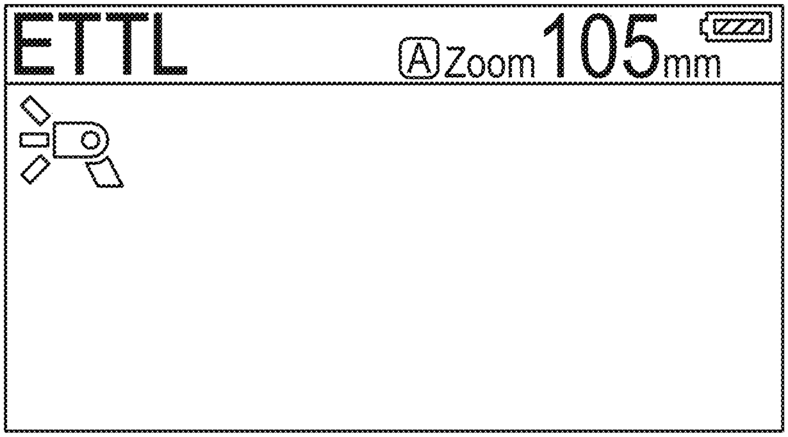
Figure 4C:
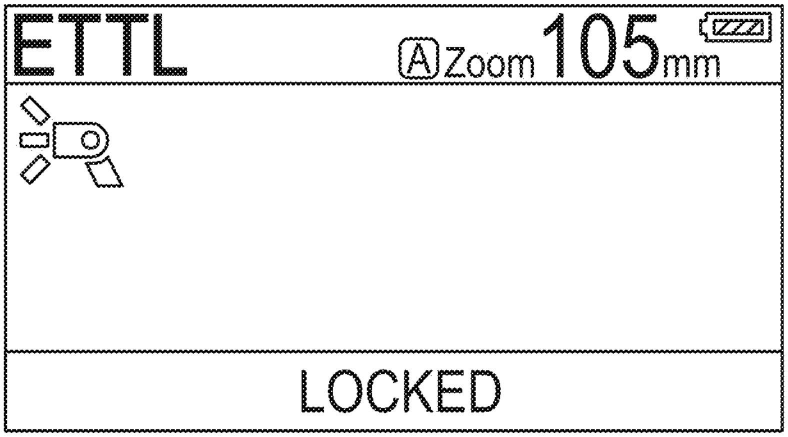

Default setting control of the accessory 300 will be described with reference to FIGS. 3, 4A to 4C, and 5. FIG. 3 is a diagram illustrating a flowchart of the default setting control of the accessory 300. FIGS. 4A to 4C are diagrams illustrating a display screen of the accessory 300. FIG. 5 is a diagram illustrating details of default settings of the accessory 300.

The flowchart in FIG. 3 is started by notification of information to the accessory control unit 301 from the camera control unit 101.

In step S101, the accessory control unit 301 receives information transmitted from the camera control unit 101 via the accessory communication unit 108.

In step S102, the accessory control unit 301 determines whether the information received in step S101 is information about an image capturing mode. In a case where the accessory control unit 301 determines that the received information is information about an image capturing mode (YES in step S102), the processing proceeds to step S103. Otherwise (NO in step S102), the processing in this flowchart ends.

In step S103, the accessory control unit 301 compares information about an image capturing mode stored beforehand and the latest information about the image capturing mode received in step S101, and determines whether there is a change. In a case where there is a change (YES in step S103), the processing proceeds to step S104. Otherwise (NO in step S103), the processing in this flowchart ends.

In step S104, the accessory control unit 301 determines whether the information about the image capturing mode received in step S101 indicates an image capturing mode belonging to a simple image-capturing zone.

In a case where the information is determined to indicate an image capturing mode belonging to the simple image-capturing zone (YES in step S104), the processing proceeds to step S105. Meanwhile, in a case where the information is determined to indicate an image capturing mode belonging to an application image-capturing zone (NO in step S104), the processing proceeds to step S108. Here, the simple image-capturing zone includes an image capturing mode in which image capturing parameters (such as exposure control values and white balance (WB)) for entry-level users are automatically determined by the camera control unit 101 and a user cannot change the image capturing parameters. Examples of such a mode include a fully automatic image capturing mode, a scene selection mode, a creative filter mode, and a plus movie auto mode. On the other hand, the application image-capturing zone includes an image capturing mode in which a user can change the image capturing parameters. Examples of such a mode include a P mode, an Av mode, a Tv mode, a manual mode, a BULB mode, and a custom image capturing mode.

In step S105, the accessory control unit 301 stores setting values (user setting values) set so far, in the accessory storage unit 305. This is to utilize setting values at the time when the image capturing mode is an image capturing mode belonging to the application image-capturing zone, when the image capturing mode belonging to the application image-capturing zone is used again. Examples of items (functions) for storing the setting values include light emission mode, light control correction amount, wireless setting, zoom position setting, and flash synchronization setting illustrated in FIG. 5. The items for storing the setting values are not limited to these examples, and other items may be added or some of the items may be excluded.

In step S106, the accessory control unit 301 acquires default setting values from the accessory storage unit 305.

In step S107, the accessory control unit 301 reflects the default setting values acquired in step S106 in the setting values of the accessory 300. Here, the default setting values of the accessory 300 are predetermined setting values that are, for example, values illustrated in FIG. 5. The default setting of each of the items illustrated in FIG. 5 will be described. The light emission mode indicates an automatic light control (ETTL or TTL) setting as the default setting value. As values of the light emission mode, there are Manual, Multi, and Custom, other than the automatic light control. The light control correction amount of ETTL indicates ±0 as the default setting value. The wireless setting indicates a non-wireless setting as the default setting value. The zoom position setting indicates an AUTO setting as the default setting value, and the accessory control unit 301 acquires zoom position information about the image capturing lens 202 from the camera control unit 101 via the accessory communication unit 108, and controls the light distribution angle to an angle corresponding to the zoom position of the light emission unit 302. The flash synchronization setting indicates a leading curtain synchronization setting as the default setting value. The default setting values illustrated in FIG. 5 are only examples, and setting values different from the values in FIG. 5 may be set as the default setting values.

In step S108, the accessory control unit 301 acquires setting values previously stored in the accessory storage unit 305 in step S105.

In step S109, the accessory control unit 301 reflects the setting values acquired in step S108 in the setting values of the accessory 300.

In step S110, the accessory control unit 301 displays the setting values set in step S107 or step S109 on the accessory display unit 304. FIG. 4A is a display example in a case where information indicating an image capturing mode belonging to the application image-capturing zone is received or a case where connection to the camera is not established. In this state, the default setting values are not set, and the user can set any setting value. In the display example of the present exemplary embodiment, the light emission mode, the wireless setting, the zoom setting, the flash synchronization setting, and the amount of light emission (the light control correction amount depending on mode) are displayed, but information other than these items may be displayed. FIG. 4B is a display example in a case where information indicating an image capturing mode belonging to the simple image-capturing zone is received. In the present exemplary embodiment, the light emission mode and the zoom setting are displayed, but information other than these items may be displayed.

In step S111, in a case where information indicating an image capturing mode belonging to the simple image-capturing zone is received, the accessory control unit 301 prohibits reception of operation signals except for the power switch. This results in a function-restricted state where the setting values cannot be changed from the default settings even if operation signals except for the power switch are received from the accessory operation unit 303. FIG. 4C is a display example when the user operates the accessory operation unit 303 in the state in FIG. 4B, so that an operation signal other than the power switch is output, and the operation signal other than the power switch is detected by the accessory control unit 301. The accessory control unit 301 displays "LOCKED" on the accessory display unit 304 and prohibits screen transition, so that it is possible to prevent the user from changing the setting values.

Figure 6:
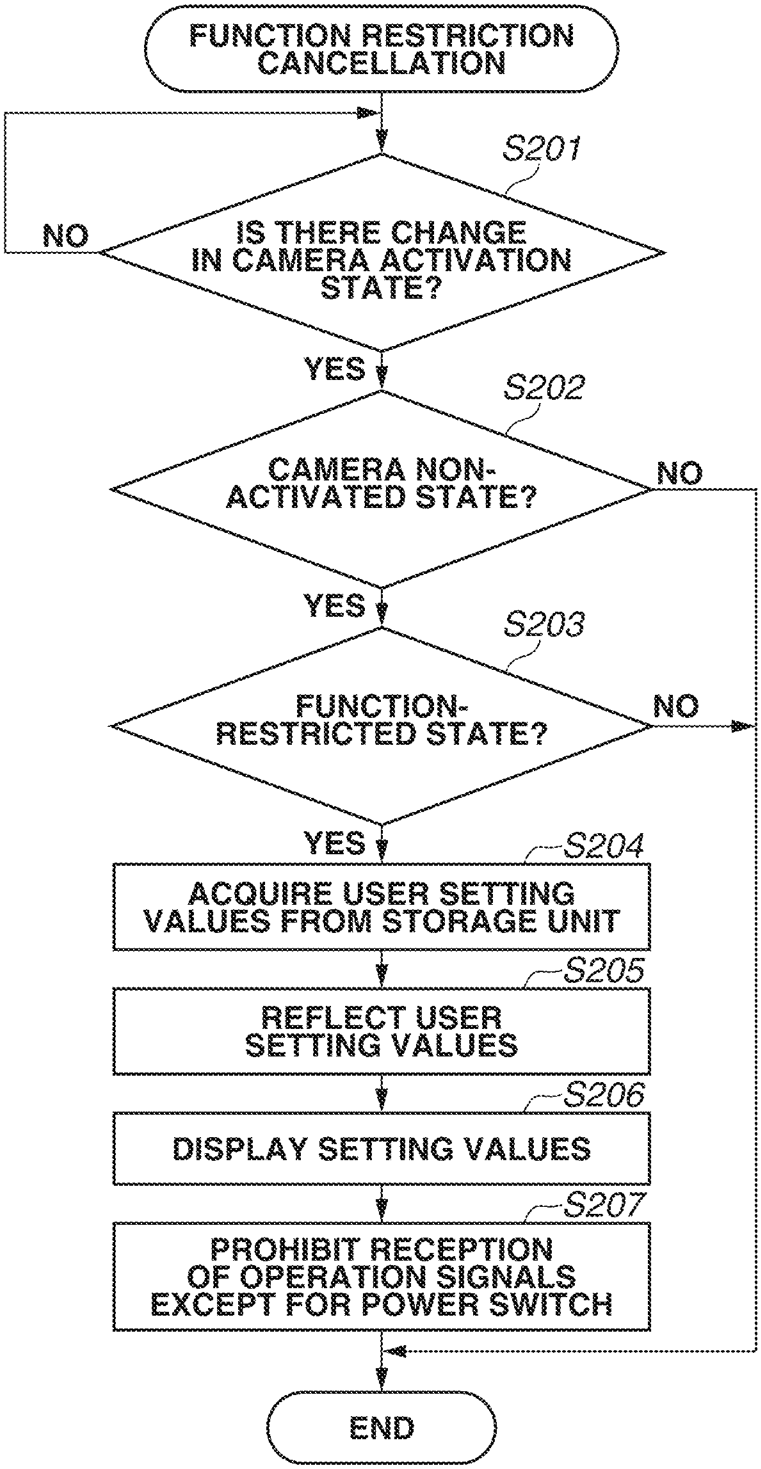
FIG. 6 is a diagram illustrating a flowchart of default setting cancel control of an accessory according to a first exemplary embodiment of the present disclosure.

Default setting cancel control in the first exemplary embodiment will be described with reference to a flowchart in FIG. 6. In the present exemplary embodiment, the default settings are canceled when the camera body 100 shifts to a non-activated state. The flowchart in FIG. 6 is executed in a case where the accessory 300 is attached to the camera body 100 and the accessory lock unit 307 is at the fixing position.

In step S201, the accessory control unit 301 monitors the camera activation state notification unit 109, and determines whether there is a change in the camera activation state. In a case where there is a change in the camera activation state (YES in step S201), the processing proceeds to step S202. Otherwise (NO in step S201), the accessory control unit 301 continues to monitor the camera activation state notification unit 109. The camera activation state notification unit 109 electrically connects the camera control unit 101 and the accessory control unit 301, and the camera control unit 101 issues a notification about the activation state, by changing the signal level to the high level in a case where the activation state of the camera body 100 is the activated state, and changing the signal level to the low level in a case where the activation state is the non-activated state. The signal levels corresponding to the respective states may be reversed.

In step S202, the accessory control unit 301 confirms the camera activation state notification unit 109, and determines whether the camera activation state is the non-activated state. In a case where the camera activation state is the non-activated state (YES in step S202), the processing proceeds to step S203. Otherwise (NO in step S202), the processing ends. In the present exemplary embodiment, the accessory control unit 301 monitors the camera activation state notification unit 109, but a scheme in which the camera activation state is determined based the activation state of the camera body 100 communicated to the accessory control unit 301 via the accessory communication unit 108 may be adopted.

In step S203, the accessory control unit 301 determines whether information about the image capturing mode received from the camera control unit 101 indicates an image capturing mode belonging to the simple image-capturing zone, and the function-restricted state is established. In a case where the accessory control unit 301 determines that the function-restricted state is established (YES in step S203), the processing proceeds to step S204. Otherwise (NO in step S203), the processing in this flowchart ends.

In step S204, the accessory control unit 301 acquires the setting values stored in the accessory storage unit 305 in step S105.

In step S205, the accessory control unit 301 reflects the setting values acquired in step S204 in the setting values of the accessory 300.

In step S206, the accessory control unit 301 displays the setting values set in step S205 on the accessory display unit 304. In this step, for example, the values are displayed as illustrated in FIG. 4A.

In step S207, the accessory control unit 301 permits the acceptance of operation signals except for the power switch prohibited in step S111. This enables the user to freely change the setting values of the accessory 300 by operating the accessory operation unit 303. In other words, the function-restricted state where the setting values are fixed to the default setting values is canceled.

In this way, in the present exemplary embodiment, the default settings of the accessory 300 can be canceled based on whether there is a change in the activation state of the camera body 100, i.e., whether the state of the camera body 100 has changed from the connection state where communication with the accessory 300 is enabled.

Default setting cancel control in a second exemplary embodiment will be described with reference to a flowchart in FIG. 7. In the present exemplary embodiment, default settings are canceled when a user operates the accessory lock unit 307 of the accessory 300 to move from the fixing position to the unfixing position.

Figure 7:
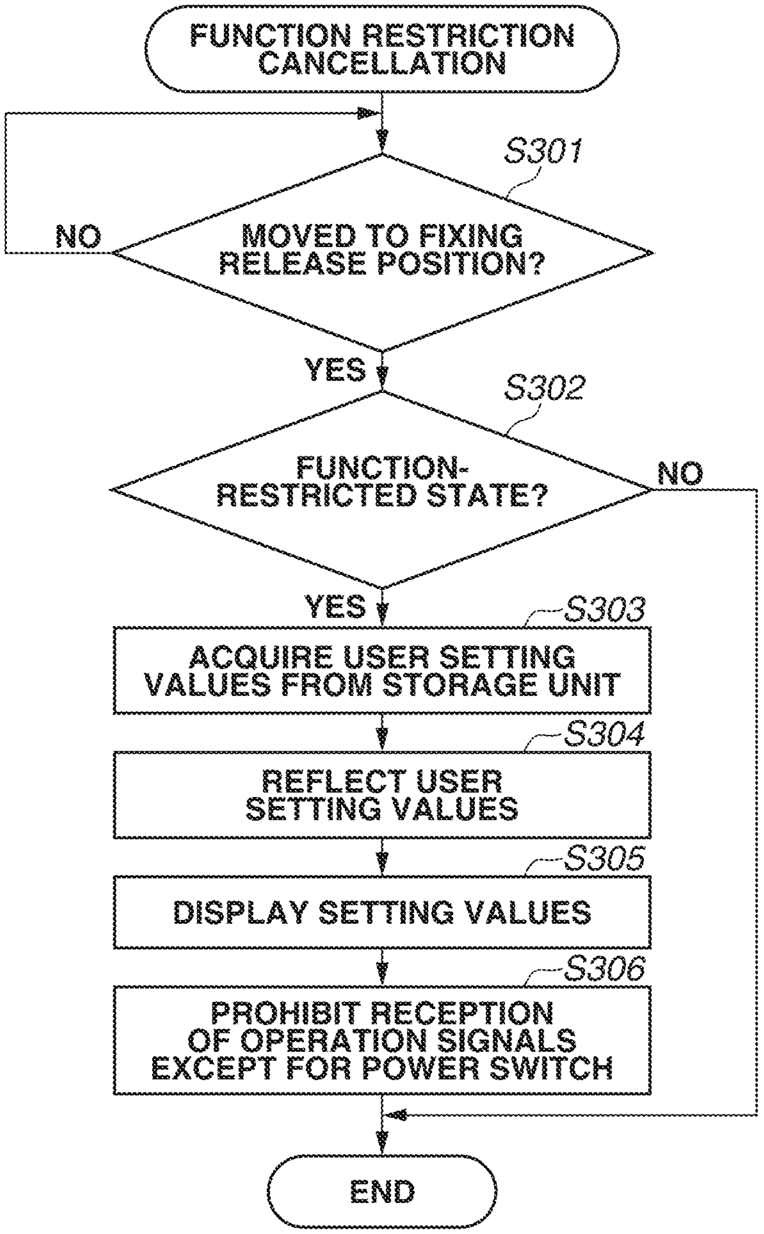
FIG. 7 is a diagram illustrating a flowchart of default setting cancel control of an accessory according to a second exemplary embodiment of the present disclosure.

The flowchart in FIG. 7 is executed in a case where the accessory 300 is attached to the camera body 100 and the accessory lock unit 307 is at the fixing position.

In step S301, the accessory control unit 301 monitors the accessory lock unit 307, and determines whether the position of the accessory lock unit 307 has moved from the fixing position to the unfixing position. In a case where the accessory control unit 301 determines that the position has moved to the unfixing position (YES in step S301), the processing proceeds to step S302. Otherwise (NO in step S301), the monitoring continues.

In step S302, the accessory control unit 301 determines whether information about the image capturing mode received from the camera control unit 101 indicates an image capturing mode belonging to the simple image-capturing zone and the function-restricted state is established. In a case where the accessory control unit 301 determines that the function-restricted state is established (YES in step S302), the processing proceeds to step S303. Otherwise (NO in step S302), the processing in this flowchart ends.

In step S303, the accessory control unit 301 acquires the setting values stored in the accessory storage unit 305 in step S105.

In step S304, the accessory control unit 301 reflects the setting values acquired in step S303 in the setting values of the accessory 300.

In step S305, the accessory control unit 301 displays the setting values set in step S304 on the accessory display unit 304. In this step, for example, the values are displayed as illustrated in FIG. 4A.

In step S306, the accessory control unit 301 permits the acceptance of operation signals except for the power switch prohibited in step S111. This enables the user to freely change the setting values of the accessory 300 by operating the accessory operation unit 303. In other words, the function-restricted state where the setting values are fixed to the default setting values is canceled.

In this way, in the present exemplary embodiment, the default settings of the accessory 300 can be canceled based on whether there is a change in the connection state of the camera body 100 and the accessory 300, i.e., whether the connection state of the camera body 100 and the accessory 300 has changed from the fixed state.

While the method of canceling the function-restricted state of the accessory 300 is described in each of the above-described two exemplary embodiments, the two methods may be executed in combination, or another method of canceling the function-restricted state may be included.

While the example in which the accessory 300 is the light emission device is described in the above-described two exemplary embodiments, the items for setting the default setting values or the values of the default settings may be determined depending on the type of the accessory. For example, in a case where the accessory 300 is a microphone, the directivity of the microphone and ON/OFF of wind cut are the items for setting the default setting values. If a stereo setting or a monaural setting can be selected as the directivity of the microphone, the monaural setting is used as the default setting value.

While the example in which the default settings are used as the setting values of the accessory 300 in the image capturing mode belonging to the simple image-capturing zone is described in the above-described two exemplary embodiments, which image capturing mode is the mode in which the default settings are used as the setting values of the accessory 300 can be appropriately set. Which image capturing mode is the mode in which the default settings are used as the setting values of the accessory 300 may be varied depending on the type of the accessory. In other words, the default settings may be used as the setting values of the accessory 300 in a first image capturing mode among a plurality of image capturing modes, and a user may be allowed to set setting values of predetermined items of the accessory 300 in a second image capturing mode different from the first image capturing mode.

While some exemplary embodiments of the present disclosure have been described, the present disclosure is not limited to these exemplary embodiments, and various modifications and changes can be made within the scope of the spirit thereof.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-166754, filed Oct. 18, 2022, which is hereby incorporated by reference herein in its entirety.

What is claimed is:

1. An accessory configured to be attachable to and detachable from an image pickup apparatus, the accessory comprising:

at least one processor configured to function as:

an acquisition unit configured to acquire information about an image capturing mode of the image pickup apparatus to which the accessory is attached;

a setting unit configured to set a setting value of a predetermined item; and a detection unit configured to detect an activation state of the image pickup apparatus to which the accessory is attached, wherein the setting unit sets a predetermined setting value as the setting value of the predetermined item in a case where the information acquired by the acquisition unit indicates a first image capturing mode, and the setting unit sets the setting value of the predetermined item to be changeable from the predetermined setting value in a case where the activation state of the image pickup apparatus to which the accessory is attached is detected by the detection unit as a non-activated state in a state where the predetermined setting value is set as the setting value of the predetermined item, the accessory further comprising a display unit configured to display information about the setting value of the predetermined item, wherein the display unit displays information indicating that the setting value of the predetermined item is not changeable in a state where the predetermined setting value is set as the setting value of the predetermined item.

2. The accessory according to claim 1, wherein the first image capturing mode is an image capturing mode in which a user is unable to change an image capturing parameter.

3. The accessory according to claim 1, further comprising a storage unit configured to store a value as the setting value of the predetermined item before the predetermined setting value is set, wherein the setting unit changes the setting value of the predetermined item to the value stored in the storage unit from the predetermined setting value.

4. The accessory according to claim 1, further comprising an operation unit configured to be used for changing the setting value of the predetermined item, wherein an operation on the operation unit to change the setting value of the predetermined item is not accepted in a state where the predetermined setting value is set as the setting value of the predetermined item.

5. The accessory according to claim 1, wherein the accessory is a light emission device.

6. The accessory according to claim 5, wherein the predetermined item is least one of a light emission mode, a light control correction amount, a wireless setting, a zoom position setting, and a flash synchronization setting.

7. A control method for an accessory configured to be attachable to and detachable from an image pickup apparatus, the control method comprising:

acquiring information about an image capturing mode of the image pickup apparatus to which the accessory is attached;

setting a setting value of a predetermined item;

detecting an activation state of the image pickup apparatus to which the accessory is attached, wherein, in the setting, a predetermined setting value is set as the setting value of the predetermined item in a case where the acquired information indicates a first image capturing mode, and the setting value of the predetermined item is changeable from the predetermined setting value in a case where the activation state of the image pickup apparatus to which the accessory is attached is detected as a non-activated state in a state where the predetermined setting value is set as the setting value of the predetermined item; and displaying information about the setting value of the predetermined item, wherein the information about the setting value of the predetermined item is displayed and the displayed information indicates that the setting value of the predetermined item is not changeable in a state where the predetermined setting value is set as the setting value of the predetermined item.

8. An accessory configured to be attachable to and detachable from an image pickup apparatus, the accessory comprising:

at least one processor configured to function as:

an acquisition unit configured to acquire information about an image capturing mode of the image pickup apparatus to which the accessory is attached;

a setting unit configured to set a setting value of a predetermined item; and a detection unit configured to detect an activation state of the image pickup apparatus to which the accessory is attached, wherein the setting unit sets a predetermined setting value as the setting value of the predetermined item in a case where the information acquired by the acquisition unit indicates a first image capturing mode, and the setting unit sets the setting value of the predetermined item to be changeable from the predetermined setting value in a case where the activation state of the image pickup apparatus to which the accessory is attached is detected by the detection unit as a non-activated state in a state where the predetermined setting value is set as the setting value of the predetermined item, the accessory further comprising an operation unit configured to be used for changing the setting value of the predetermined item, wherein an operation on the operation unit to change the setting value of the predetermined item is not accepted in a state where the predetermined setting value is set as the setting value of the predetermined item.

9. The accessory according to claim 8, wherein the first image capturing mode is an image capturing mode in which a user is unable to change an image capturing parameter.

10. The accessory according to claim 8, further comprising a storage unit configured to store a value as the setting value of the predetermined item before the predetermined setting value is set, wherein the setting unit changes the setting value of the predetermined item to the value stored in the storage unit from the predetermined setting value.

11. The accessory according to claim 8, wherein the accessory is a light emission device.

12. The accessory according to claim 11, wherein the predetermined item is least one of a light emission mode, a light control correction amount, a wireless setting, a zoom position setting, and a flash synchronization setting.

13. A control method for an accessory configured to be attachable to and detachable from an image pickup apparatus, the control method comprising:

acquiring information about an image capturing mode of the image pickup apparatus to which the accessory is attached;

setting a setting value of a predetermined item; and detecting an activation state of the image pickup apparatus to which the accessory is attached, wherein, in the setting, a predetermined setting value is set as the setting value of the predetermined item in a case where the acquired information indicates a first image capturing mode, and the setting value of the predetermined item is changeable from the predetermined setting value in a case where the activation state of the image pickup apparatus to which the accessory is attached is detected as a non-activated state in a state where the predetermined setting value is set as the setting value of the predetermined item, and wherein an operation to change the setting value of the predetermined item is not accepted in a state where the predetermined setting value is set as the setting value of the predetermined item.

* * * * *